(12) United States Patent
Chan

(10) Patent No.: US 11,165,243 B2
(45) Date of Patent: Nov. 2, 2021

(54) POWER SUPPLY APPARATUS

(71) Applicant: Acer Incorporated, New Taipei (TW)

(72) Inventor: Tzu-Tseng Chan, New Taipei (TW)

(73) Assignee: Acer Incorporated, New Taipei (TW)

( * ) Notice: Subject to any disclaimer, the term of this patent is extended or adjusted under 35 U.S.C. 154(b) by 131 days.

(21) Appl. No.: 16/575,419

(22) Filed: Sep. 19, 2019

(65) Prior Publication Data

US 2020/0343718 A1 Oct. 29, 2020

(30) Foreign Application Priority Data

Apr. 24, 2019 (TW) ................... 108114295

(51) Int. Cl.
*H02H 9/00* (2006.01)
*G05F 1/573* (2006.01)
*H02H 9/02* (2006.01)
*H02H 1/04* (2006.01)

(52) U.S. Cl.
CPC ............. *H02H 9/001* (2013.01); *G05F 1/573* (2013.01); *H02H 1/043* (2013.01); *H02H 9/02* (2013.01); *H02H 9/025* (2013.01)

(58) Field of Classification Search
CPC .......... H02H 9/001; H02H 1/043; H02H 9/02; H02H 9/025; G05F 1/573
See application file for complete search history.

(56) References Cited

U.S. PATENT DOCUMENTS

| 5,859,757 | A  | * | 1/1999  | Hanafusa | G05F 1/575 361/100 |
| 6,335,654 | B1 | * | 1/2002  | Cole     | G05F 1/565 323/273 |
| 6,538,492 | B2 | * | 3/2003  | Sano     | G05F 1/565 327/530 |
| 6,538,866 | B1 | * | 3/2003  | Hanzawa  | H01L 27/0251 361/111 |
| 6,816,348 | B2 | * | 11/2004 | Chen     | H02H 11/002 361/56 |

(Continued)

FOREIGN PATENT DOCUMENTS

| CN | 101453117 | 6/2009  |
| CN | 201656760 | 11/2010 |

(Continued)

*Primary Examiner* — Kyle J Moody
(74) *Attorney, Agent, or Firm* — JCIPRNET

(57) ABSTRACT

A power supply apparatus including a protection circuit and a power conversion circuit is provided. The protection circuit includes a control circuit, an auxiliary capacitor, and a switching circuit. The control circuit receives an AC voltage from an AC power source and generates a pulsating voltage and a control signal accordingly. The auxiliary capacitor receives the pulsating voltage and provides a first voltage accordingly. The switching circuit is coupled to the auxiliary capacitor to receive the first voltage and coupled to the control circuit to receive the control signal. The switching circuit transmits the first voltage to the power conversion circuit in response to the control signal. The power conversion circuit converts the first voltage to an output voltage. When the switching circuit is switched to an on state in response to the control signal, the auxiliary capacitor reduces an input inrush current from the AC power source.

15 Claims, 3 Drawing Sheets

(56) References Cited

U.S. PATENT DOCUMENTS

| | | | | |
|---|---|---|---|---|
| 7,274,543 | B2* | 9/2007 | Nishikawa | H01L 27/0266 |
| | | | | 361/56 |
| 8,493,701 | B2* | 7/2013 | Peng | H02H 3/20 |
| | | | | 361/91.5 |
| 8,755,161 | B2* | 6/2014 | James | H02H 3/207 |
| | | | | 361/91.1 |
| 10,444,031 | B2* | 10/2019 | Yanagawa | H02H 1/0007 |
| 10,615,593 | B2* | 4/2020 | Langer | H02H 9/001 |
| 2013/0223117 | A1* | 8/2013 | Koshy | H02M 7/06 |
| | | | | 363/84 |
| 2015/0318796 | A1 | 11/2015 | Dent | |
| 2018/0212531 | A1* | 7/2018 | Hurwitz | H02M 7/217 |
| 2020/0067305 | A1* | 2/2020 | Zhu | H02H 9/001 |
| 2020/0227911 | A1* | 7/2020 | Ishihara | G01N 30/02 |
| 2021/0075312 | A1* | 3/2021 | Yoshida | H02M 7/537 |

FOREIGN PATENT DOCUMENTS

| | | |
|---|---|---|
| CN | 101964586 | 2/2011 |
| CN | 103236782 | 8/2013 |
| CN | 206422685 | 8/2017 |
| EP | 2924145 | 9/2015 |
| TW | 201121217 | 6/2011 |
| TW | 201523005 | 6/2015 |

\* cited by examiner

POWER SUPPLY APPARATUS

CROSS-REFERENCE TO RELATED APPLICATION

This application claims the priority benefit of Taiwan application serial no. 108114295, filed on Apr. 24, 2019. The entirety of the above-mentioned patent application is hereby incorporated by reference herein and made a part of this specification.

BACKGROUND OF THE INVENTION

1. Field of the Invention

The present invention relates to a power supply technology, and in particular, to a power supply apparatus capable of reducing an input inrush current.

2. Description of Related Art

With the advancement of science and technology, various types of computer apparatuses have emerged. In order to boot the computer apparatuses successfully, power supply apparatuses play a very important role. In general, current computer apparatuses (such as gaming notebooks or desktop computers) typically have a number of peripheral interfaces to plug in various peripherals based on the needs of the application. In addition, each peripheral interface usually has a large number of large capacitors to ensure that the output of each peripheral interface is stable and does not interfere with each other. Therefore, for the power supply apparatus, the entire computer system (including a computer apparatus and peripherals thereof) may be regarded substantially as a very large capacitive load.

In particular, at the moment of the power supply apparatus being activated to supply power to the entire computer system, the power supply apparatus would generate an inrush current based on the characteristics of the capacitive load, where a current value of the inrush current is directly proportional to a capacitance value of the capacitive load. It is to be understood that if the capacitance value of the capacitive load is larger, the current value of the inrush current is larger. An excessive inrush current easily damages parts in the power supply apparatus, which shortens the service life of the power supply apparatus.

SUMMARY OF THE INVENTION

The present invention provides a power supply apparatus, which can reduce an input inrush current of the power supply apparatus at the moment of the power supply apparatus being activated.

The power supply apparatus of the present invention includes a protection circuit and a power conversion circuit. The protection circuit includes a control circuit, an auxiliary capacitor, and a first switching circuit. The control circuit is configured to receive an AC voltage from an AC power source and generate a pulsating voltage and a control signal according to the AC voltage. A first end of the auxiliary capacitor is coupled to the control circuit to receive the pulsating voltage. A second end of the auxiliary capacitor is configured to provide a first voltage. A first end of the first switching circuit is coupled to the second end of the auxiliary capacitor to receive the first voltage. A control end of the first switching circuit is coupled to the control circuit to receive the control signal. The first switching circuit transmits the first voltage to a second end of the first switching circuit in response to the control signal. The power conversion circuit is coupled to the second end of the first switching circuit to receive the first voltage, and to convert the first voltage to an output voltage for supplying power to a load. When the first switching circuit is switched to an on state in response to the control signal, the auxiliary capacitor is configured to reduce an input inrush current from the AC power source.

In an embodiment of the present invention, the control circuit includes a first unidirectional conduction circuit and a control body. An input end of the first unidirectional conduction circuit is configured to receive the AC voltage. An output end of the first unidirectional conduction circuit is configured to provide the pulsating voltage. The control body is configured to receive the AC voltage, and coupled to the output end of the first unidirectional conduction circuit to receive the pulsating voltage. The control body is enabled after receiving the AC voltage, and generates the control signal according to the pulsating voltage.

In an embodiment of the present invention, the control body includes a second unidirectional conduction circuit, a voltage dividing circuit, and a drive circuit. An input end of the second unidirectional conduction circuit is configured to receive the AC voltage. An output end of the second unidirectional conduction circuit is configured to provide a second voltage. The voltage dividing circuit is coupled to the output end of the second unidirectional conduction circuit to receive the second voltage, and to divide the second voltage to generate a third voltage. The drive circuit is coupled to the output end of the first unidirectional conduction circuit to receive the pulsating voltage, and coupled to the voltage dividing circuit to receive the third voltage. The drive circuit is enabled in response to the third voltage, and generates the control signal according to the pulsating voltage.

In an embodiment of the present invention, the drive circuit includes a second switching circuit, a third unidirectional conduction circuit, and a voltage regulator circuit. A first end of the second switching circuit is coupled to the output end of the first unidirectional conduction circuit to receive the pulsating voltage. A control end of the second switching circuit is coupled to the voltage dividing circuit to receive the third voltage. An input end of the third unidirectional conduction circuit is coupled to a second end of the second switching circuit. The voltage regulator circuit is coupled to an output end of the third unidirectional conduction circuit to provide the control signal.

In an embodiment of the present invention, the drive circuit further includes a fourth unidirectional conduction circuit and a first current limiting circuit. An input end of the fourth unidirectional conduction circuit is coupled to the output end of the third unidirectional conduction circuit. The first current limiting circuit is coupled between an output end of the fourth unidirectional conduction circuit and the control end of the first switching circuit.

In an embodiment of the present invention, the drive circuit further includes a second current limiting circuit. The second current limiting circuit is coupled between the output end of the first unidirectional conduction circuit and the first end of the second switching circuit.

In an embodiment of the present invention, a ratio of a capacitance value of the auxiliary capacitor to a capacitance value of the load is less than or equal to one fifth.

Based on the above, in the power supply apparatus provided by the embodiment of the present invention, when the first switching circuit is switched to the on state, the auxiliary capacitor is substantially connected in series with a load capacitor. Since a capacitance value of an equivalent capacitor formed by connecting the auxiliary capacitor and the load capacitor in series decreases and a current value of an input inrush current flowing into the power supply apparatus is directly proportional to the capacitance value of the above equivalent capacitor, the series connection of the auxiliary capacitor and the load capacitor can effectively reduce the input inrush current to avoid damage to the power supply apparatus due to an excessive input inrush current.

In order to make the aforementioned and other objectives and advantages of the present invention comprehensible, embodiments accompanied with figures are described in detail below.

DESCRIPTION OF THE EMBODIMENTS

Figure 1:
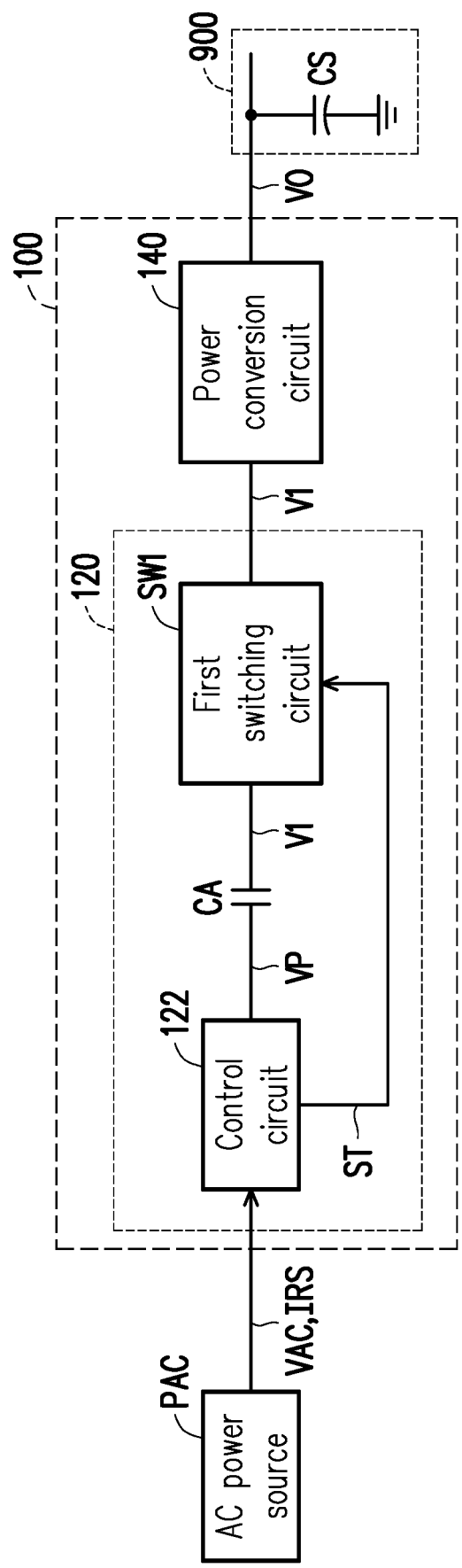
FIG. 1 is a circuit block diagram of a power supply apparatus according to an embodiment of the present invention.

In order to make the content of the present invention more comprehensible, embodiments are described below as examples of implementation of the present invention. Wherever possible, the same reference numbers are used in the drawings and the description to refer to the same or like parts, components or steps.

FIG. 1 is a circuit block diagram of a power supply apparatus 100 according to an embodiment of the present invention. Referring to FIG. 1, the power supply apparatus 100 may include, but is not limited to, a protection circuit 120 and a power conversion circuit 140. The protection circuit 120 may include a control circuit 122, an auxiliary capacitor CA, and a first switching circuit SW1. The control circuit 122 is configured to receive an AC voltage VAC from an AC power source PAC and generate a pulsating voltage VP and a control signal ST according to the AC voltage VAC. A first end of the auxiliary capacitor CA is coupled to the control circuit 122 to receive the pulsating voltage VP. A second end of the auxiliary capacitor CA is configured to provide a first voltage V1. A first end of the first switching circuit SW1 is coupled to the second end of the auxiliary capacitor CA to receive the first voltage V1. A control end of the first switching circuit SW1 is coupled to the control circuit 122 to receive the control signal ST. The first switching circuit SW1 may transmit the first voltage V1 to a second end of the first switching circuit SW1 in response to the control signal ST. The power conversion circuit 140 is coupled to the second end of the first switching circuit SW1 to receive the first voltage V1, and the power conversion circuit 140 is configured to convert the first voltage V1 to an output voltage VO for supplying power to a load 900. In addition, at the moment of the power supply apparatus 100 being activated to supply power to the load 900, the load 900 may be regarded as a capacitor CS.

In particular, when the first switching circuit SW1 is switched to an on state in response to the control signal ST, the auxiliary capacitor CA may be configured to reduce an input inrush current IRS from the AC power source PAC. In detail, at the moment of the power supply apparatus 100 being activated, the control circuit 122 receives an AC voltage VAC from the AC power source PAC and generates a pulsating voltage VP and a control signal ST accordingly. The first switching circuit SW1 may be switched to an on state in response to the control signal ST. When the first switching circuit SW1 is switched to the on state, the auxiliary capacitor CA may be substantially regarded as being connected in series with the capacitor CS through the power conversion circuit 140. Since a capacitance value of an equivalent capacitor formed by connecting the auxiliary capacitor CA and the capacitor CS in series decreases and a current value I of the input inrush current IRS is directly proportional to the capacitance value C of the above equivalent capacitor (that is, $$\left(\text{that is, } I = C \cdot \frac{dV}{dt}\right),$$

the series connection of the auxiliary capacitor CA and the capacitor CS can effectively reduce the input inrush current IRS to avoid damage to the power supply apparatus 100 due to an excessive input inrush current IRS.

For example, assuming that the capacitance value of the capacitor CS of the load 900 is 5,000 microfarads (μF), and the capacitance value of the auxiliary capacitor CA in the power supply apparatus 100 is 680 μF, the capacitance value of the equivalent capacitor formed by connecting the auxiliary capacitor CA and the capacitor CS in series is about 600 μF. Compared with the power supply apparatus not provided with the auxiliary capacitor, the power supply apparatus 100 of the present embodiment can reduce the capacitance value of the equivalent capacitor on a current loop from 5,000 μF to 600 μF, thereby greatly reducing the current value of the input inrush current IRS.

In an embodiment of the present invention, a ratio of the capacitance value of the auxiliary capacitor CA to the capacitance value of the capacitor CS is less than or equal to one fifth. However, the present invention is not limited thereto.

In an embodiment of the present invention, the first switching circuit SW1 may be implemented using a power transistor. However, the present invention is not limited thereto.

In an embodiment of the present invention, the power conversion circuit 140 may be implemented using various types of existing power conversion circuits. However, the present invention is not limited thereto.

Figure 2:
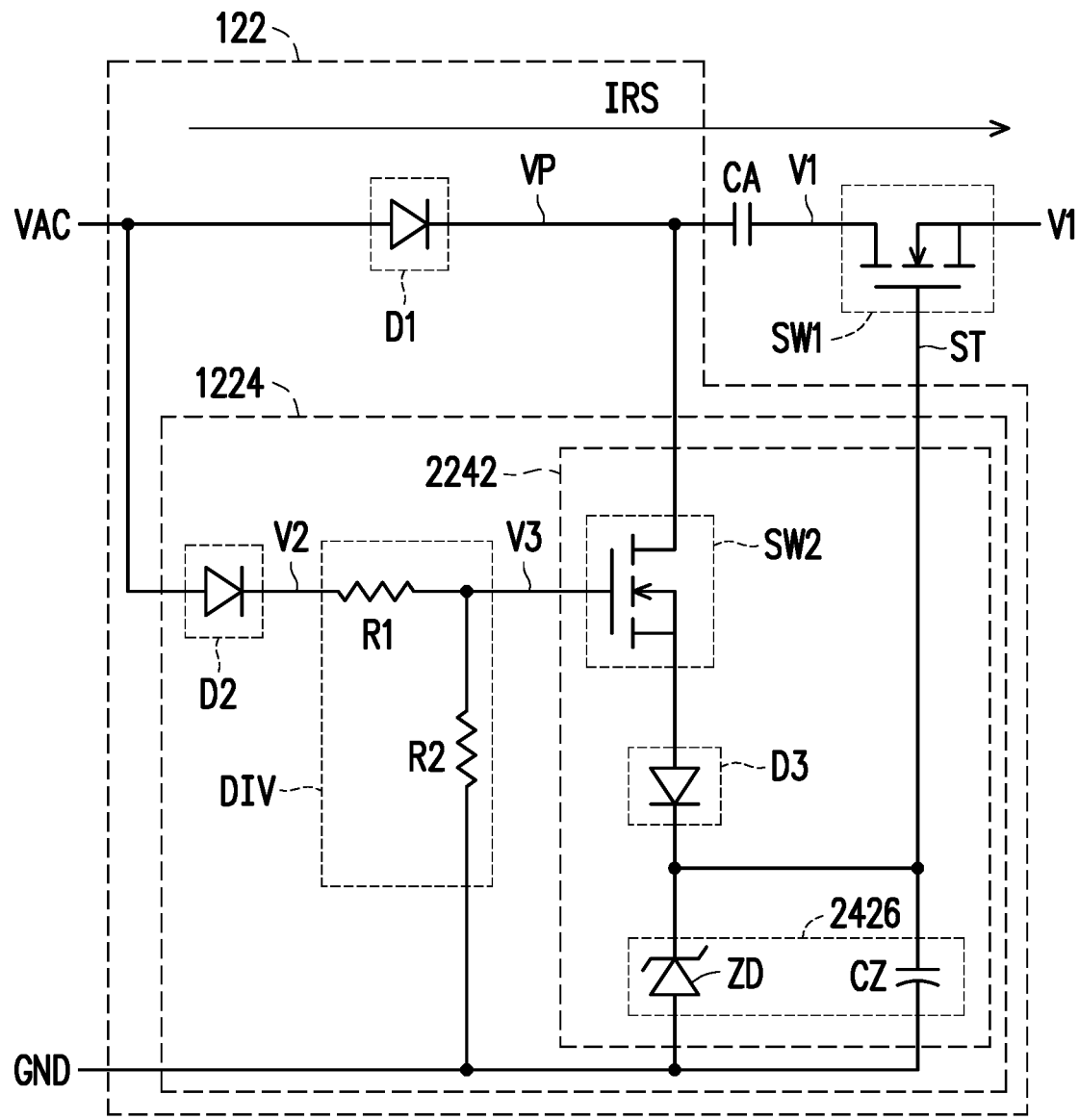
FIG. 2 is a circuit block diagram of a control circuit according to an embodiment of the present invention.

FIG. 2 is a circuit block diagram of a control circuit 122 according to an embodiment of the present invention. Referring to FIG. 1 and FIG. 2 together, the control circuit 122 includes a first unidirectional conduction circuit D1 and a control body 1224. An input end of the first unidirectional conduction circuit D1 is configured to receive the AC voltage VAC. An output end of the first unidirectional conduction circuit D1 is configured to provide the pulsating voltage VP. The control body 1224 receives the AC voltage VAC, and is coupled to the output end of the first unidirectional conduction circuit D1 to receive the pulsating voltage VP. The control body 1224 is enabled after receiving the AC voltage VAC, and generates the control signal ST according to the pulsating voltage VP.

In an embodiment of the present invention, the first unidirectional conduction circuit D1 may be implemented by using a diode. An anode end of the diode is the input end of the first unidirectional conduction circuit D1, and a cathode end of the diode is the output end of the first unidirectional conduction circuit D1. However, the present invention is not limited thereto. In other embodiments of the present invention, the first unidirectional conduction circuit D1 may also be implemented by using unidirectional power transmission circuits well known to those of ordinary skill in the art.

In an embodiment of the present invention, the control body 1224 may include a second unidirectional conduction circuit D2, a voltage dividing circuit DIV, and a drive circuit 2242. An input end of the second unidirectional conduction circuit D2 receives the AC voltage VAC. An output end of the second unidirectional conduction circuit D2 is configured to provide a second voltage V2. The voltage dividing circuit DIV is coupled to the output end of the second unidirectional conduction circuit D2 to receive the second voltage V2, and to divide the second voltage V2 to generate a third voltage V3. The drive circuit 2242 is coupled to the output end of the first unidirectional conduction circuit D1 to receive the pulsating voltage VP, and coupled to the voltage dividing circuit DIV to receive the third voltage V3. The drive circuit 2242 may be enabled in response to the third voltage V3, and generates the control signal ST according to the pulsating voltage VP.

In an embodiment of the present invention, the voltage dividing circuit DIV may include resistors R1 and R2. A first end of the resistor R1 is coupled to the output end of the second unidirectional conduction circuit D2 to receive the second voltage V2. A second end of the resistor R1 is coupled to a first end of the resistor R2 to provide the third voltage V3. A second end of the resistor R2 is coupled to a ground end GND.

In an embodiment of the present invention, the drive circuit 2242 may include, but is not limited to, a second switching circuit SW2, a third unidirectional conduction circuit D3, and a voltage regulator circuit 2426. A first end of the second switching circuit SW2 is coupled to the output end of the first unidirectional conduction circuit D1 to receive the pulsating voltage VP. A control end of the second switching circuit SW2 is coupled to the voltage dividing circuit DIV to receive the third voltage V3. An input end of the third unidirectional conduction circuit D3 is coupled to a second end of the second switching circuit SW2. The voltage regulator circuit 2426 is coupled to an output end of the third unidirectional conduction circuit D3 to provide the control signal ST.

In an embodiment of the present invention, the second switching circuit SW2 may be implemented by using a power transistor. However, the present invention is not limited thereto.

In an embodiment of the present invention, the second unidirectional conduction circuit D2 and the third unidirectional conduction circuit D3 may be implemented by using a circuit similar to the first unidirectional conduction circuit D1.

In an embodiment of the present invention, the voltage regulator circuit 2426 may include, but is not limited to, a Zener diode ZD and a regulated capacitor CZ. A cathode end of the Zener diode ZD is coupled to the output end of the third unidirectional conduction circuit D3. An anode end of the Zener diode ZD is coupled to the ground end GND. The regulated capacitor CZ is coupled between the cathode end and the anode end of the Zener diode ZD. In other embodiments of the present invention, the regulated capacitor CZ may also be omitted for the voltage regulator circuit 2426.

The detailed operation of the control circuit 122 of FIG. 2 will be described below. Please refer to FIG. 1 and FIG. 2 together. Before the power supply apparatus 100 is activated, the initial states of the first switching circuit SW1 and the second switching circuit SW2 are an off state. At the moment of the power supply apparatus 100 being activated, the AC power source PAC supplies the AC voltage VAC to the control circuit 122, such that the first unidirectional conduction circuit D1 provides the pulsating voltage VP and the second unidirectional conduction circuit D2 provides the second voltage V2. The voltage dividing circuit DIV may divide the second voltage V2 to generate the third voltage V3. When the voltage value of the third voltage V3 rises to a specific voltage value, the second switching circuit SW2 is turned on, such that the third unidirectional conduction circuit D3 is turned on. At this time, the Zener diode ZD breaks down in response to the pulsating voltage VP, and cooperates with the regulated capacitor CZ to provide a stable control signal ST. A voltage value of the control signal ST may be, for example, a breakdown voltage value of the Zener diode ZD. Then, the first switching circuit SW1 may be turned on in response to the control signal ST.

At the moment of the first switching circuit SW1 being turned on, the AC power source PAC, the first unidirectional conduction circuit D1, the auxiliary capacitor CA, the first switching circuit SW1, the power conversion circuit 140, and the capacitor CS of the load 900 form a current loop, and the auxiliary capacitor CA is connected in series with the capacitor CS through the power conversion circuit 140. Since a capacitance value of an equivalent capacitor formed by connecting the auxiliary capacitor CA and the capacitor CS in series decreases and a current value of the input inrush current IRS is directly proportional to the capacitance value of the above equivalent capacitor, the input inrush current IRS on a current loop can be reduced to avoid damage to the power supply apparatus 100 due to an excessive input inrush current IRS.

Figure 3:
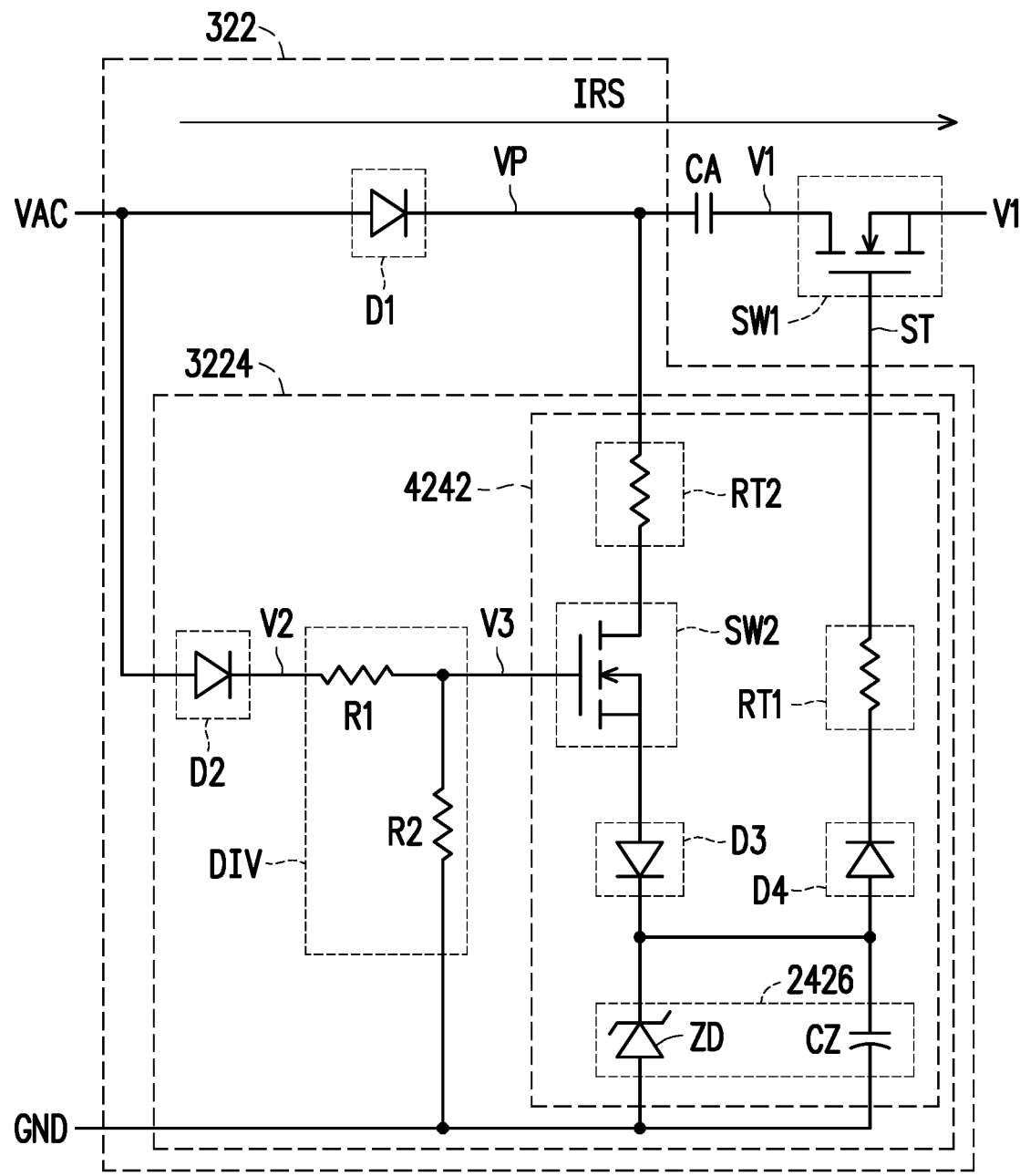
FIG. 3 is a circuit block diagram of a control circuit according to another embodiment of the present invention.

FIG. 3 is a circuit block diagram of a control circuit 322 according to another embodiment of the present invention. Referring to FIG. 2 and FIG. 3 together, the control circuit 322 includes a first unidirectional conduction circuit D1 and a control body 3224. The control body 3224 may include a second unidirectional conduction circuit D2, a voltage dividing circuit DIV, and a drive circuit 4242. The implementations of the first unidirectional conduction circuit D1, the second unidirectional conduction circuit D2, and the voltage dividing circuit DIV of FIG. 3 are respectively similar to the first unidirectional conduction circuit D1, the second unidirectional conduction circuit D2, and the voltage dividing circuit DIV of FIG. 2, so references may be made to the related descriptions of FIG. 2. The descriptions thereof are omitted herein.

In addition, the drive circuit 4242 of FIG. 3 is similar to the drive circuit 2242 of FIG. 2, except that the drive circuit 4242 of FIG. 3 further includes a fourth unidirectional conduction circuit D4, a first current limiting circuit RT1, and a second current limiting circuit RT2. An input end of the fourth unidirectional conduction circuit D4 is coupled to the output end of the third unidirectional conduction circuit D3. The first current limiting circuit RT1 is coupled between an output end of the fourth unidirectional conduction circuit D4 and the control end of the first switching circuit SW1 to protect the first switching circuit SW1. The second current limiting circuit RT2 is coupled between the output end of the first unidirectional conduction circuit D1 and the first end of the second switching circuit SW2 to limit current flowing into the second switching circuit SW2.

In an embodiment of the present invention, the fourth unidirectional conduction circuit D4 may be implemented using a circuit similar to the first unidirectional conduction circuit D1.

In an embodiment of the present invention, the first current limiting circuit RT1 and the second current limiting circuit RT2 may be implemented using resistors. However, the present invention is not limited thereto. In other embodiments of the present invention, the first current limiting circuit RT1 and the second current limiting circuit RT2 may also be implemented using current limiting circuits well known to those of ordinary skill in the art.

In addition, the operation of the control circuit 322 of FIG. 3 is similar to the control circuit 122 of FIG. 2, so references may be made to the related descriptions of FIG. 2 for the operation details of the control circuit 322. The descriptions thereof are omitted herein.

Based on the above, in the power supply apparatus provided by the embodiment of the present invention, when the first switching circuit is switched to the on state, the auxiliary capacitor is substantially connected in series with a load capacitor. Since a capacitance value of an equivalent capacitor formed by connecting the auxiliary capacitor and the load capacitor in series decreases and a current value of an input inrush current flowing into the power supply apparatus is directly proportional to the capacitance value of the above equivalent capacitor, the series connection of the auxiliary capacitor and the load capacitor can effectively reduce the input inrush current to avoid damage to the power supply apparatus due to an excessive input inrush current.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A power supply apparatus, comprising:
   a protection circuit, comprising:
      a control circuit, configured to receive an AC voltage from an AC power source and generate a pulsating voltage and a control signal according to the AC voltage;
      an auxiliary capacitor, a first end of the auxiliary capacitor being coupled to the control circuit to receive the pulsating voltage, and a second end of the auxiliary capacitor being configured to provide a first voltage; and
      a first switching circuit, a first end of the first switching circuit being coupled to the second end of the auxiliary capacitor to receive the first voltage, a control end of the first switching circuit being coupled to the control circuit to receive the control signal, and the first switching circuit transmitting the first voltage to a second end of the first switching circuit in response to the control signal; and
   a power conversion circuit, coupled to the second end of the first switching circuit to receive the first voltage, and configured to convert the first voltage to an output voltage for supplying power to a load,
   wherein when the first switching circuit is switched to an on state in response to the control signal, the auxiliary capacitor is configured to reduce an input inrush current from the AC power source.

2. The power supply apparatus according to claim 1, wherein the control circuit comprises:
   a first unidirectional conduction circuit, an input end of the first unidirectional conduction circuit being configured to receive the AC voltage, and an output end of the first unidirectional conduction circuit being configured to provide the pulsating voltage; and
   a control body, configured to receive the AC voltage, and coupled to the output end of the first unidirectional conduction circuit to receive the pulsating voltage, wherein the control body is enabled after receiving the AC voltage, and generates the control signal according to the pulsating voltage.

3. The power supply apparatus according to claim 2, wherein the control body comprises:
   a second unidirectional conduction circuit, an input end of the second unidirectional conduction circuit being configured to receive the AC voltage, and an output end of the second unidirectional conduction circuit being configured to provide a second voltage;
   a voltage dividing circuit, coupled to the output end of the second unidirectional conduction circuit to receive the second voltage, and configured to divide the second voltage to generate a third voltage; and
   a drive circuit, coupled to the output end of the first unidirectional conduction circuit to receive the pulsating voltage, and coupled to the voltage dividing circuit to receive the third voltage, wherein the drive circuit is enabled in response to the third voltage, and generates the control signal according to the pulsating voltage.

4. The power supply apparatus according to claim 3, wherein the drive circuit comprises:
   a second switching circuit, a first end of the second switching circuit being coupled to the output end of the first unidirectional conduction circuit to receive the pulsating voltage, and a control end of the second switching circuit being coupled to the voltage dividing circuit to receive the third voltage;
   a third unidirectional conduction circuit, an input end of the third unidirectional conduction circuit being coupled to a second end of the second switching circuit; and
   a voltage regulator circuit, coupled to an output end of the third unidirectional conduction circuit to provide the control signal.

5. The power supply apparatus according to claim 4, wherein the voltage regulator circuit comprises:
   a Zener diode, a cathode end of the Zener diode being coupled to the output end of the third unidirectional conduction circuit, and an anode end of the Zener diode being coupled to a ground end; and
   a regulated capacitor, coupled between the cathode end and the anode end of the Zener diode.

6. The power supply apparatus according to claim 5, wherein a voltage value of the control signal is a breakdown voltage value of the Zener diode.

7. The power supply apparatus according to claim 6, wherein when the second switching circuit is turned on, the third unidirectional conduction circuit is turned on, and the Zener diode breaks down in response to the pulsating voltage, such that the regulated capacitor provides the control signal with the breakdown voltage value.

8. The power supply apparatus according to claim 7, wherein the first switching circuit is turned on according to the control signal with the breakdown voltage value.

9. The power supply apparatus according to claim 8, wherein when the first switching circuit is turned on, the first unidirectional conduction circuit, the auxiliary capacitor, the first switching circuit, the power conversion circuit, and the load form a current loop, and the auxiliary capacitor and a capacitor of the load are connected in series.

10. The power supply apparatus according to claim 4, wherein the drive circuit further comprises:
   a fourth unidirectional conduction circuit, an input end of the fourth unidirectional conduction circuit being coupled to the output end of the third unidirectional conduction circuit; and
   a first current limiting circuit, coupled between an output end of the fourth unidirectional conduction circuit and the control end of the first switching circuit.

11. The power supply apparatus according to claim 10, wherein the first current limiting circuit is a resistor.

12. The power supply apparatus according to claim 10, wherein the drive circuit further comprises:
   a second current limiting circuit, coupled between the output end of the first unidirectional conduction circuit and the first end of the second switching circuit.

13. The power supply apparatus according to claim 12, wherein the second current limiting circuit is a resistor.

14. The power supply apparatus according to claim 10, wherein each of the first unidirectional conduction circuit, the second unidirectional conduction circuit, the third unidirectional conduction circuit, and the fourth unidirectional conduction circuit is a diode, an anode end of each diode being an input end, and a cathode end of each diode being an output end.

15. The power supply apparatus according to claim 1, wherein a ratio of a capacitance value of the auxiliary capacitor to a capacitance value of the load is less than or equal to one fifth.

* * * * *